United States Patent
Speicher et al.

(10) Patent No.: US 8,402,144 B2
(45) Date of Patent: Mar. 19, 2013

(54) PARAMETERIZABLE SELECTION OF A COMMUNICATION SYSTEM ON THE BASIS OF NAME RESOLUTION MECHANISMS

(75) Inventors: Sebastian Speicher, Bonn (DE); Sabine Demel, Vienna (AT); Dieter Jacocsohn, Bonn (DE); Karl-Heinz Nenner, Bornheim (DE)

(73) Assignee: T-Mobile International AG, Bonn (DE)

( * ) Notice: Subject to any disclaimer, the term of this patent is extended or adjusted under 35 U.S.C. 154(b) by 126 days.

(21) Appl. No.: 12/674,748

(22) PCT Filed: Aug. 23, 2008

(86) PCT No.: PCT/EP2008/006943
§ 371 (c)(1),
(2), (4) Date: Jun. 1, 2010

(87) PCT Pub. No.: WO2009/027066
PCT Pub. Date: Mar. 5, 2009

(65) Prior Publication Data
US 2010/0306386 A1  Dec. 2, 2010

(30) Foreign Application Priority Data
Aug. 27, 2007 (DE) .................. 10 2007 040 621

(51) Int. Cl.
*G06F 15/16* (2006.01)

(52) U.S. Cl. ........ 709/227; 709/219; 709/223; 709/225; 709/238

(58) Field of Classification Search .................. 709/219, 709/223, 225, 238, 227
See application file for complete search history.

(56) References Cited

U.S. PATENT DOCUMENTS

| 7,343,399 B2 * | 3/2008 | Hayball et al. ................ 709/219 |
| 2004/0186850 A1 | 9/2004 | Chowdhury et al. |
| 2005/0124382 A1 | 6/2005 | Britt et al. |

FOREIGN PATENT DOCUMENTS

EP  0 817 444  1/1998

* cited by examiner

*Primary Examiner* — Adnan Mirza
(74) *Attorney, Agent, or Firm* — FaegreBaker Daniels LLP

(57) ABSTRACT

The invention relates to a method for establishing a communication link between a communication system and a remote station by means of a communication network, whereby, in the context of the communication link, a parameterized selection of a remote station is made from several available remote stations by utilizing the name resolution mechanism. The communication forms a logical name with the help of parameters used for selecting a remote station or embeds the parameters in a logical name and transmits the formed logical name to a name resolution mechanism located in the communication network. The name resolution mechanism selects a remote station on the basis of the afore-mentioned logical name and a selection function and feeds back the communication address thereof.

14 Claims, 1 Drawing Sheet

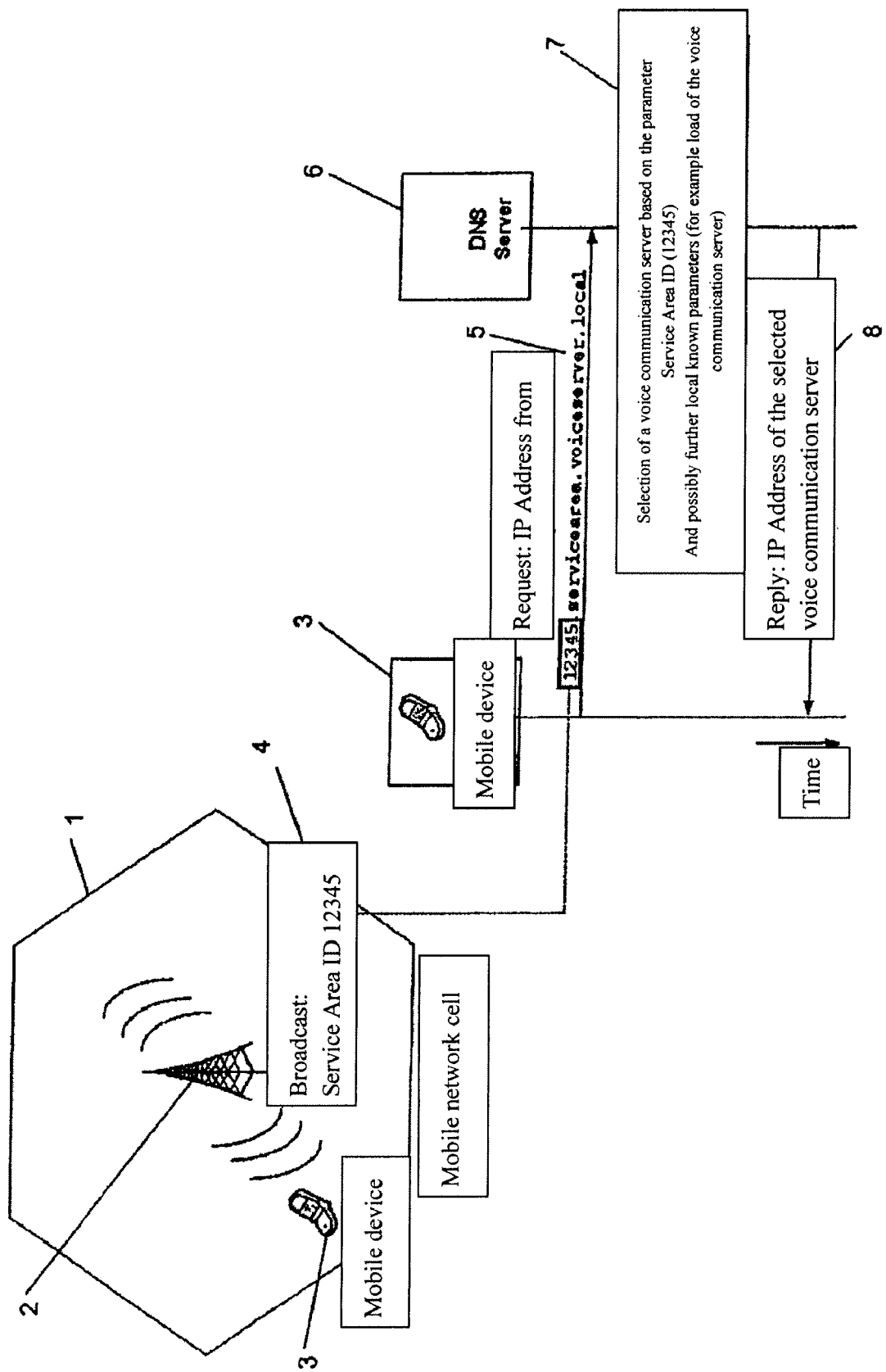

US 8,402,144 B2

PARAMETERIZABLE SELECTION OF A COMMUNICATION SYSTEM ON THE BASIS OF NAME RESOLUTION MECHANISMS

BACKGROUND

The invention describes a parameterizable mechanism for the selection of support systems and administrative systems or of desired communication partners using name resolution mechanisms in the context of communication links.

Initially, as a starting point, the state of the art is described in order to then, building on this, explain the key and additional features of the invention.

Usually, several further support systems and administrative systems are involved in line with the processing and administration between communication systems or between communication systems and networks. Thus, before a communication connection can be established, the needed support systems and administrative systems must be found or selected in order to establish a communications address. Furthermore, if necessary (depending of the communication scenario), the desired communication partner is to be automatically chosen or found. In order to be able to discuss both cases generally, the term "remote station" is used equivalently to the terms "support system" and "administrative system" or the term "communication partner".

In the case that several equivalent remote stations are respectively available, there is a request for
(a) a more suitable selection mechanism considering the appropriate parameters and
(b) in connection with this, a mechanism to establish the communication address of the remote station which was selected in step (a).

In many communication networks, the latter (the establishing of the communications address of a system), is based on name resolution mechanisms that map the abstract logical name of a remote station's communication partner onto its actual communication address.

SUMMARY

It is the objective of the invention to specify a method which allows a parameterized selection of remote stations in the context of communication connections and networks on the basis of name resolutions mechanisms.

This objective is solved by means of a method with the characteristics of claim 1.

Preferred embodiments and other more advantageous characteristics of the invention are specified in the subclaims.

K is a communication system, which requires support systems or administrative systems for the establishing of communication connections over a communication network, or tries to establish a connection to a communication partner over a communication network. The objective is therefore to select a remote station of a corresponding type and to establish its communication address.

The core idea of the solution of the present invention is that the communication system K forms or embeds a logical name N by means of the parameters P1, . . . , Pn.

Therefore the essential advantage of this approach is that name resolution mechanisms (including the for this reason already existing communication protocols) deployed in already existing and present communication networks can be used to select remote stations based on parameter and can be used to transfer its communication address. This is only possible through the above represented solution, according to the invention, by embedding the needed parameter for the selection in the logical name to be resolved or by forming the logical name with parameters. Only one parameter or several parameters can be intended for the forming or embedding in the logical name. The parameter can include, for example, information about the location of the communications system. The parameter can include information about the communication provider of the communication system. The parameter can include information about the subscriber contract assigned over the communication system. Generally the parameters can describe the characteristics of the communication system and/or the characteristics of the communication network and/or the characteristics of the user of the communication system.

A technical example of a name resolution mechanism is the Domain Name System (DNS). The DNS is a worldwide database hierarchy distributed over thousands of servers which manages the name space of the internet. This name space is divided into so called zones for which independent administrators are responsible. The DNS is primarily used to convert domain names into IP addresses. This is comparable with a phone book in that the names of the users are resolved into their telephone numbers.

In this case, the communication system K forms a domain name by means of the parameters P1, Pn, which can be converted by the DNS into a communication address, of an Internet Protocol (IP) type, by means of a static pre-configured or dynamic selection function F and can be returned to the communications system K.

A preferred embodiment of the invention is that the parameters P1, . . . , Pn or the information for the deriving thereof are statically configured in the communication system K.

A preferred embodiment of the invention is that the communication system K receives the parameters P1, . . . , Pn or the information for the deriving thereof from the communication network by means of a specific request or through a broadcast.

A preferred embodiment of the invention is that the communication system K receives the parameters P1, . . . , Pn or the information for the deriving thereof as a result of or in the course of its log in/connection ("Attachment") to the communication network, for example by logging in a mobile terminal into a mobile phone network.

A preferred embodiment of the invention is that the communication system K already undertakes the selection of the remote station and constructs the corresponding logical name.

A preferred embodiment of the invention is that both the communication system K as also the name resolution mechanism or the selection function F contained therein are involved in the selection of the remote station, as respectively described above.

In addition to the logical name N, the selection function F can also take into account further parameters, as for example: the utilization of the support systems and administrative systems; or the communication parameter; or the utilization of the communication network; and additionally, on the basis of this additional parameter, it can select a corresponding remote station and return its communication address, for example the communication address of the support system or administration system which is least used to its capacity.

BRIEF DESCRIPTION OF THE DRAWING

An execution example of the invention is clarified in the following by means of the drawing.

DETAILED DESCRIPTION

FIG. 1 schematically shows a mobile communication network for the execution of the method in the present invention. A mobile network cell 1 of the mobile communication network and a base station 2 which supplies the mobile network 1 with radio signals is represented. A communication system 3, for example in the form of a mobile device, is located in the mobile network 1 and needs support through a support system, for example a "voice communication server" (not shown). The selection of the "responsible" voice communication server should be made on the basis of information about the location of the mobile device 3. The approximate location of the mobile device 3 can be determined by means of the "service area ID" parameter of the current mobile network cell 1. The total area covered by the mobile network is divided in service area IDs 4. The service area ID 4 of a mobile network cell 1 is permanently communicated from the assigned base stations 2 through broadcast to all mobile devices 3 within the respective mobile network cell(s). Every service area ID is unique and can be received from the mobile device 3. The mobile device 3 can determine the mobile network cell 1 from the service area ID 4 and thereby can determine the approximate place where the device is located.

In order to be able to establish the connection to a suitable voice communication server, the mobile device 3 embeds the received service area ID 4 (for example: "12345") in a domain name 5 (for example: "servicearea.voiceserver.local") which is sent to the DNS server 6 of the mobile network. This composite domain name (for example: "12345.servicearea.voiceserver.local") causes the DNS server 6 to select a corresponding voice communication server and to transmit its communication address back to the mobile device 3. Based on the parameter included in the domain name, the DNS server selects the "service area ID" and, as the case may be, further known parameters, for example, the current load of the available voice communication server selects a suitable voice communication server (block 7) and sends its IP address (the communication address), of the selected voice communication server, back to the mobile device (block 8). The IP address (communication address) can thereupon be used to construct a communication connection with the support system "voice communication server".

In order to perform the method described above, a code is embodied in a non-transitory storage medium, wherein the code is executed on a data processing system of the communication system.

The invention claimed is:

1. A method for establishing a communication link between a communication system and a remote station by means of a communication network, whereby, in the context of the communication link, a parameterized selection of a remote station is made from among a plurality of available remote stations by utilizing a name resolution mechanism, whereby the communication system forms or embeds a logical name by means of parameters used for the selection of a remote station and transmits this so-formed logical name to a name resolution mechanism present in the communication network, which selects a remote station based on this logical name and a selection function and returns its communication address to the communication system, wherein the parameters or the information for the deriving thereof are statically configured in the communication system and the communication system receives the parameters or the information for the deriving thereof from the communication network by means of a specific request or through a broadcast and wherein the selection function takes into account further parameters in addition to the logical name, which include the load of the available support systems or administration systems or communications parameter or network load, and additionally based on this additional parameter selects a corresponding remote station and returns its communication address to the communication system.

2. The method according to claim 1, wherein a Domain Name System, DNS, is used as the name resolution mechanism.

3. The method according to claim 2, wherein the communication system itself is responsible for the selection of the remote station and constructs the corresponding logical name.

4. A communication system and communication network with equipment adapted for the execution of the method according to claim 1.

5. A data processing system with a program code that, when carried out on data processing systems of a communication system and communication network, performs the method according to claim 1.

6. A non-transitory storage medium which embodies a program code that can be carried out on a data processing system of a communication system and communication network for the execution of the method according to claim 1.

7. The method according to claim 1, wherein the communication system itself is responsible for the selection of the remote station and constructs the corresponding logical name.

8. The method according to claim 2, wherein both the communication system and also the name resolution mechanism and/or a selection function contained therein are involved in the selection of the remote station.

9. The method according to claim 3, wherein both the communication system and also the name resolution mechanism and/or a selection function contained therein are involved in the selection of the remote station.

10. A communication system and communication network with equipment adapted for the execution of the method according to claim 2.

11. A data processing system with a program code that, when carried out on data processing systems of a communication system and communication network, performs the method according to claim 2.

12. A non-transitory storage medium which embodies a program code that can be carried out on a data processing system of a communication system and communication network for the execution of the method according to claim 2.

13. The method according to claim 2, wherein the communication system itself is responsible for the selection of the remote station and constructs the corresponding logical name.

14. The method of claim 1, wherein the communication system is a mobile communication device.

* * * * *